US009762791B2

United States Patent
Deng (10) Patent No.: US 9,762,791 B2
(45) Date of Patent: Sep. 12, 2017

(54) PRODUCTION OF FACE IMAGES HAVING PREFERRED PERSPECTIVE ANGLES

(71) Applicant: Intel Corporation, Santa Clara, CA (US)

(72) Inventor: Yining Deng, Fremont, CA (US)

(73) Assignee: INTEL Corporation, Santa Clara, CA (US)

( * ) Notice: Subject to any disclaimer, the term of this patent is extended or adjusted under 35 U.S.C. 154(b) by 251 days.

(21) Appl. No.: 14/536,310

(22) Filed: Nov. 7, 2014

(65) Prior Publication Data

US 2016/0134803 A1    May 12, 2016

(51) Int. Cl.
*G06K 9/00* (2006.01)
*G06K 9/62* (2006.01)
*G06T 15/00* (2011.01)
*H04N 5/232* (2006.01)

(52) U.S. Cl.
CPC ..... *H04N 5/23219* (2013.01); *H04N 5/23222* (2013.01); *H04N 5/23293* (2013.01)

(58) Field of Classification Search
USPC .......................... 382/155, 118, 154; 345/419
See application file for complete search history.

(56) References Cited

U.S. PATENT DOCUMENTS

| | | | | |
|---|---|---|---|---|
| 7,379,071 B2* | 5/2008 | Liu | .......................... | G06T 13/40 345/582 |
| 7,760,933 B2* | 7/2010 | Nagao | ................. | G06K 9/00281 382/118 |
| 8,861,800 B2* | 10/2014 | Savvides | ............ | G06K 9/00201 351/204 |
| 2002/0106114 A1* | 8/2002 | Yan | ..................... | G06K 9/00288 382/118 |
| 2003/0123713 A1* | 7/2003 | Geng | .................. | G06K 9/00288 382/118 |
| 2004/0151365 A1* | 8/2004 | An Chang | ........... | G06K 9/2036 382/154 |
| 2007/0086627 A1* | 4/2007 | Kim | .................... | G06K 9/00241 382/118 |
| 2008/0310720 A1* | 12/2008 | Park | .......................... | G06T 7/73 382/181 |

(Continued)

OTHER PUBLICATIONS

Yang et al., "Eye Gaze Correction with Stereovision for Video-Teleconferencing", Microsoft Corporation, Technical Report MSR-TR-2001-119, Dec. 2001, 15 pages.

(Continued)

*Primary Examiner* — Kathleen Y Dulaney
(74) *Attorney, Agent, or Firm* — Finch & Maloney PLLC (57) ABSTRACT

Techniques are disclosed for identifying preferred orientations of a face in view of various preference factors and for producing a face image having a preferred orientation. The techniques allow a user to take a so-called selfie or have a video chat and appear as if he/she is looking into the camera with a face orientation that has been determined to be optimal for various factors. Such factors may be associated with face type (e.g., face shape, face color), image capture conditions (e.g., time of day, location, light condition, background), and/or the preferences of a particular user. The factors may also be directly associated with and/or dependent on face orientation (e.g., relative nostril size, facial symmetry, relative eye size, eye height).

21 Claims, 7 Drawing Sheets

(56) References Cited

U.S. PATENT DOCUMENTS

| | | | | |
|---|---|---|---|---|
| 2009/0300554 A1* | 12/2009 | Kallinen | ............ | G06F 3/04883 |
| | | | | 715/863 |
| 2010/0266206 A1* | 10/2010 | Jo | ...................... | G06K 9/00261 |
| | | | | 382/190 |
| 2012/0313937 A1* | 12/2012 | Beeler | ..................... | G06T 19/00 |
| | | | | 345/419 |
| 2013/0002541 A1* | 1/2013 | Kanehira | ................. | G09G 5/34 |
| | | | | 345/156 |
| 2013/0057656 A1* | 3/2013 | Hwang | .................. | G06T 17/00 |
| | | | | 348/47 |
| 2014/0056540 A1* | 2/2014 | Hamburg | ............ | G06F 21/6218 |
| | | | | 382/299 |
| 2015/0169945 A1* | 6/2015 | Connell, II | ........ | G06K 9/00248 |
| | | | | 382/118 |
| 2015/0206354 A1* | 7/2015 | Shibuhisa | .......... | H04N 5/23219 |
| | | | | 348/46 |

OTHER PUBLICATIONS

"You Spin 360 Lite", AppRevels Co., Ltd., Released May 15, 2011, http://apps.apprevels.com/prt/app/you-spin-360-life/435690183, 3 pages.

* cited by examiner

PRODUCTION OF FACE IMAGES HAVING PREFERRED PERSPECTIVE ANGLES

BACKGROUND

Self-taken pictures or "selfies" have become more prevalent due to increased popularity of mobile electronic devices that include cameras, such as smartphones and tablet computers. Typically, when taking a selfie a user views the display of a mobile electronic device that includes the camera. This often results in an image with the user appearing as if they are looking away from the camera due to the offset that typically exists between the display and camera of mobile electronic devices. Similar phenomena exist in video chatting and video conferencing applications, where users are often viewing a display of a computer device that is offset from a camera that is capturing a face image of the user for display to other video chat/conference participants.

Video conferencing systems have been proposed that use multiple cameras to capture a user from different angles, such as a first angle tilted from above and a second angle tilted from below and that then synthesize an image of the user as if viewed from straight ahead. Such systems have focused on matching multiple images using 3D face models or stereo matching techniques, and synthesizing new views given a defined virtual angle.

DETAILED DESCRIPTION

Techniques are disclosed for identifying preferred orientations of a face in view of various preference factors. The techniques may also be used to produce a face image having a preferred orientation. As will be appreciated in light of this disclosure, the techniques allow a user to take a so-called selfie or have a video chat and appear as if he/she is looking into the camera with a face orientation that has been determined to be optimal for various factors. Such factors may be associated with face type (e.g., face shape, face color, eigenvectors), image capture conditions (e.g., time of day, location, light condition, background), and/or the preferences of a particular user. The factors may also be directly associated with and/or dependent on face orientation (e.g., relative nostril size, facial symmetry, relative eye size, eye height).

In an embodiment, a synthesized face image of a user is constructed from multiple face images taken from different perspective angles. The synthesized face image is presented to a user on a display at a suggested perspective angle that has been determined to be optimal for the user, based on factors that include face type and image capture conditions, among others. The user may adjust the suggested perspective angle to his or her desired preference. For example, in one such case a touch screen computing device is used and the adjustments can be made by tapping the edges/corners of the synthesized image or finger swapping the synthesized image or otherwise selecting user interface control features configured to cause adjustments to the currently displayed perspective angle. The view angle adjustments available to the user via the user interface may include, for example, pan, tilt, and rotation, in one example embodiment. In any case, the ultimately selected view angle along with all other possible view angles can be stored as personal preferences, either directly on the device or remotely such as in a cloud based server. Hence, during a subsequent video chat or selfie session, the user's computing system can access the selected view angle and automatically make adjustments so that the user will appear in the resulting imagery to be looking at the camera with the user's preferred face orientation.

Changes that a user makes to the suggested face orientation may be used, along with information on the user's face type and image capture conditions, to update information regarding optimal face orientations for other users having similar face types and/or under similar image capture conditions. A learning algorithm may learn from or otherwise train based on user made changes to the suggested face orientation in order to update optimal face orientations for similar face types and/or image capture conditions.

In one example embodiment, the techniques are implemented as a methodology that can be executed or otherwise carried out by mobile computing devices such as a smart phone or laptop or tablet computer, or in the context of an online or so-called cloud-based service including a client-server arrangement. In any such example scenarios, the methodology includes capturing or otherwise receiving one or more images of a face. In some cases, preference factors that may determine a preferred face orientation are then identified, either from the images of the face (e.g., face type, face color, time of day, location, light condition, background) or directly from the user or a stored profile of the user, such that a preferred orientation may be suggested for the face. A face image is then produced with the preferred perspective angles either by synthesizing or capturing a face image. Synthesizing a face image may include applying captured face images to a face model and rotating the face image to the preferred perspective angles associated with the user. Capturing a face image may include guiding a user with a template or other indicators to the preferred perspective angle where an image may be captured by a camera.

Figure 1:
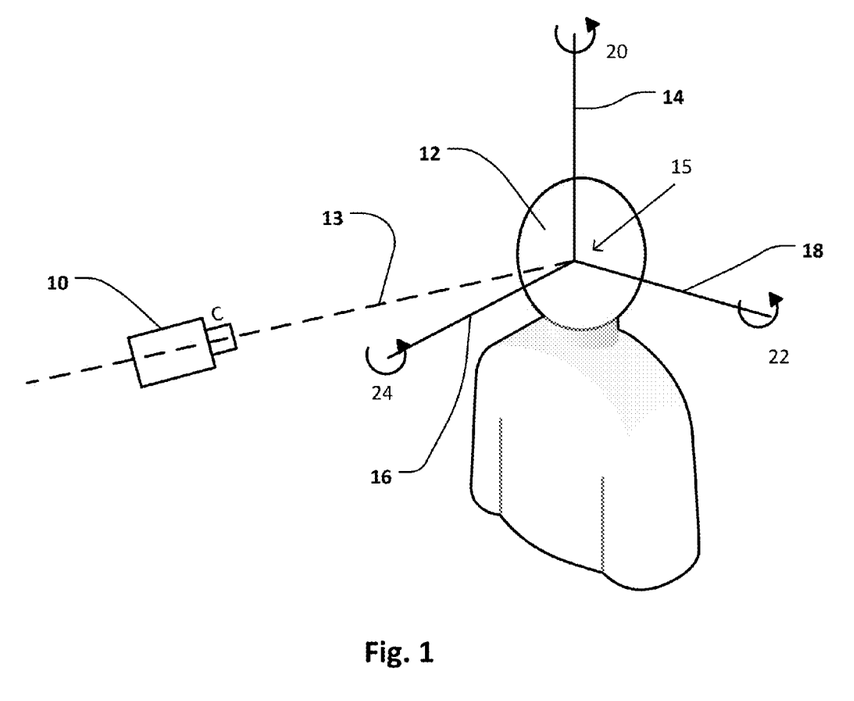
FIG. 1 shows a camera capturing a face image of a user, illustrating different types of perspective angles that exist between the camera and the face.

Turn now to the figures, and initially FIG. 1 which shows an image capture device 10 (e.g., a camera) oriented toward a face 12 of a person, including various axes and perspective angles that may be used to quantify perspective orientations of a face, according to various example embodiments. A line of sight 13 is shown to be defined by a straight line that extends between the lens of the image capture device 10 and a central point 15 on or near the face 12 of the user, such as an imaginary point positioned centrally within the head of user. Three axes, arranged orthogonal to one another, are also shown extending through the central point 15 of the head. A vertical axis 14 extends upward from the central point 15 and down through the head of the user. A forward axis 16 lies orthogonal to the vertical axes 14 and extends forward through center of the face 12, such as a point approximately in line with the nose of the user, according to some embodiments. A lateral axis 18 extends through the center point 15 of the head and lies orthogonal to each of the vertical and forward axes 14, 16, extending laterally away from the head of the user in the left and right directions.

Pan angle 20 is one type of perspective angle and represents the direction and degree to which a face is looking sideways with respect to a camera 10. As illustrated in FIG. 1, pan angle 20 may be measured as the angle about the vertical axis 14, between the line of sight 13 and the forward axis 16. Adjustments to pan angle 20 may be made either by rotating a camera 10 about the face of the user or by a user turning their head about the vertical axis 14.

Tilt angle 22 is also illustrated in FIG. 1 and is another type of perspective angle. Generally speaking, tilt angle describes the direction and degree to which the face of a user is pointing up or down in relation to the camera. A high tilt angle may reflect that the nose of a user is pointing upward, for example. Tilt angle 22 may be measured, as illustrated, as the angle between the line of sight 13 and the forward axis about the lateral axis 18. Whether a user appears to be looking at a camera is often determined, in large part, by tilt angle.

Rotation angle 24 is another perspective angle, also illustrated in the example embodiment of FIG. 1. Generally, rotation angle 24 represents the degree to which a face is cocked or angled with respect to the vertical axis 14. Rotation angle 24 may be measured, as shown in FIG. 1, as the angle between the line of sight 13 and the forward axis 16.

Preferred perspective angles may be determined for preference factors that are associated with the face type of a user, according to some embodiments. Different face types or shapes may each generally be associated with preferred perspective angles. In this respect, some embodiments may identify or suggest preferred perspective angles based, at least in part, on the face type or shape of a face of user. In such embodiments, face type or shape may be determined from face images that have been captured of a user or through other means, such as direct user input. Various analytical techniques are known for determining face type and shape from an image, including but not limited to techniques based on evaluating eigenfaces and/or tensorfaces. Some examples of face types include oblong, rectangular, round, square, inverted triangular, heart shaped, diamond shaped, triangular and oval, to name a few. It also is to be appreciated that factors associated with face type may include face color, hair color, facial hair presence, and/or facial hair style, among other potential factors.

Preferred perspective angles may, additionally or alternately, be determined for preference factors associated with an image. By way of example, particular perspective angles may be preferred for certain lighting conditions, location, background, and the like. Such conditions may be determined through various approaches, such as through analysis of an image itself, through input provided by a viewer, and/or through inputs from environmental sensors. According to some embodiments, face images that are presented to a user may be filtered to artificially produce different image capture conditions, enabling a user to view combinations of preferred perspective angles and image capture conditions.

Preferred perspective angles may, additionally or alternately, be determined based at least in part on factors that are dependent on face orientation, according to some example embodiments. In this respect, the presence, absence, or degree to which such factors are present may aid in determining preferred perspective angles for a face image. Some of such factors include eye sizes (relative to one another or other facial features), vertical heights of a user's eyes in a face image, nostril size (relative to one another or other facial features), according to some embodiments.

Figure 2:
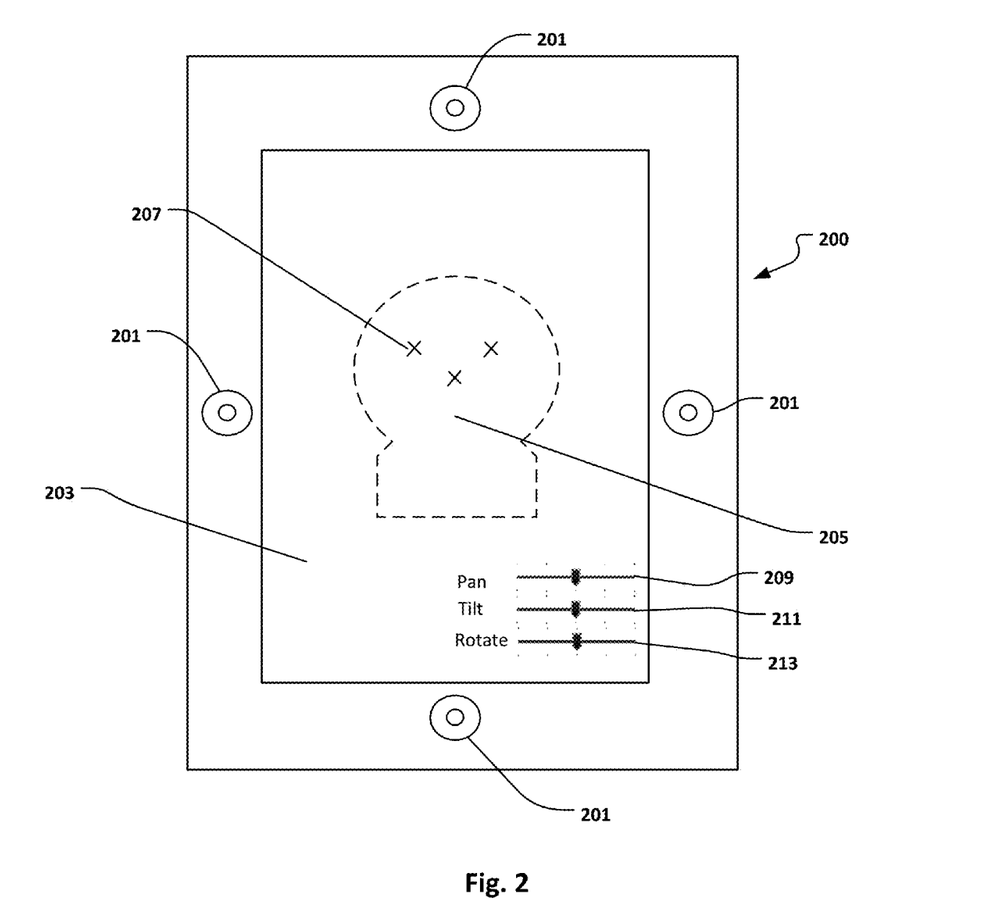
FIG. 2 shows multiple cameras mounted on a mobile electronic device that are configured to capture face images at different perspective angles at a common time, according to one embodiment of the present disclosure.
Figure 3:
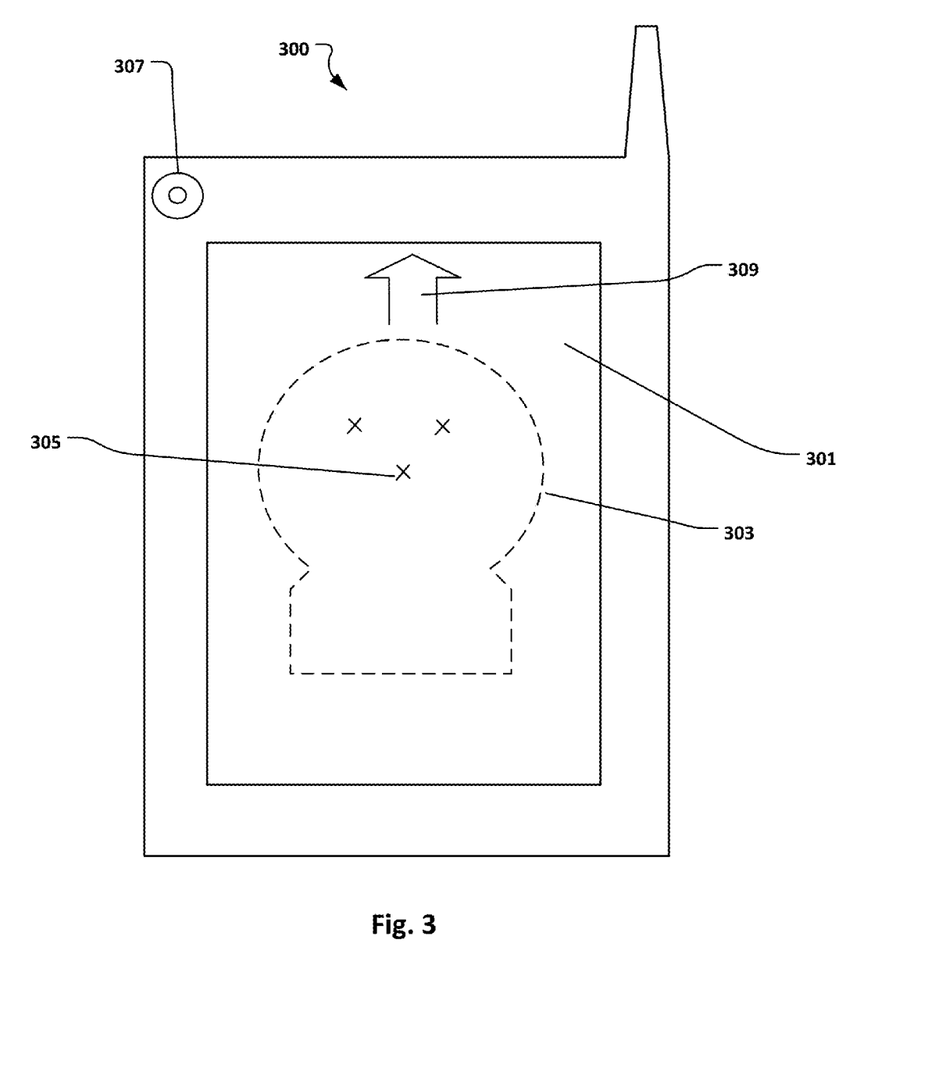
FIG. 3 shows a mobile electronic device that includes a single camera configured to capture face images at different perspective angles at different times, according to one embodiment of the present disclosure.
Figure 7:
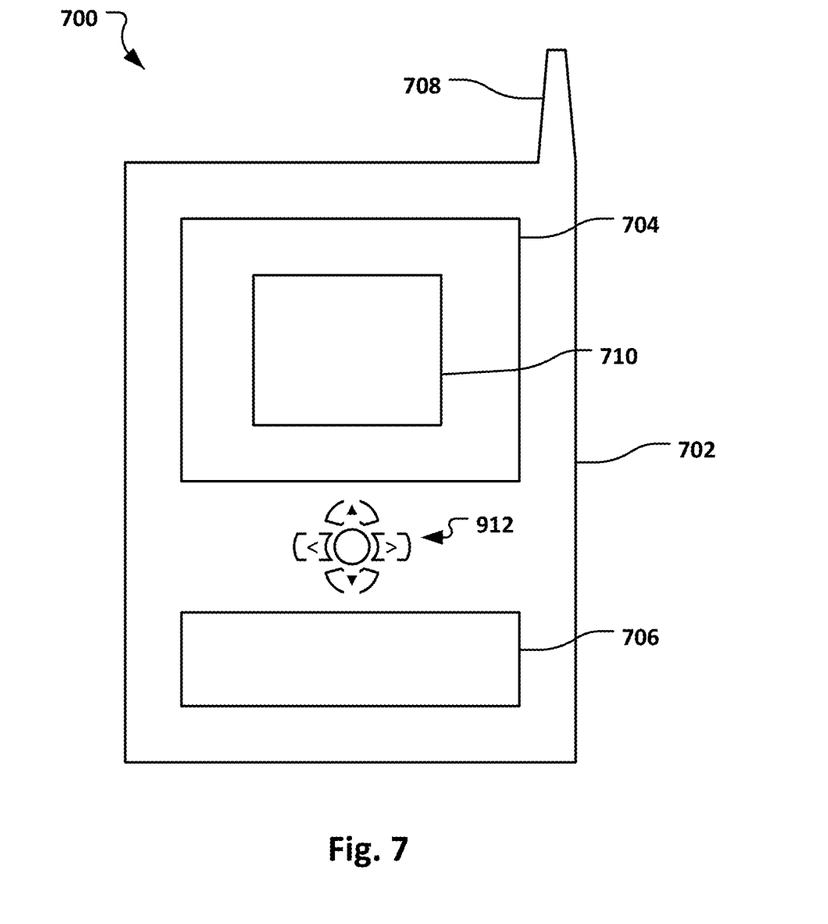
FIG. 7 shows a mobile computing system configured in accordance with an embodiment of the present disclosure.

Face images may be captured through various techniques. According to the embodiment of FIG. 2, multiple cameras 201 are configured to capture images of a face from different perspective angles at a common time. In this example case, this is accomplished with four cameras 201 positioned about the periphery of a display 203 of a tablet computer 200. Each of the four cameras 201 may capture images of a user at a common time. It is to be appreciated that other embodiments may have different numbers of cameras. According to some embodiments, a single camera may be used capture multiple images of a user from different perspective angles, but at different times. The smart phone described herein with respect to FIG. 3 is but one example of such a device. Another example is shown in FIG. 7.

Features may guide a user to position their face relative to a camera when capturing face images at different perspective angles. In the embodiment of FIG. 2, a template 205 is overlaid on a display 203 that also shows an image of the user's face as the image is being captured. In use, the user may move relative to the cameras until features of the persons head and/or face are positioned in alignment with the template 205 for image capture at a position where perspective angles are known based on the positioning of the cameras relative to the face of the user. As illustrated, the template 205 includes a general outline of the head of a user and markings 207 that may be aligned with facial features, such as the nose and eyes of the user. Such templates may be static, meaning that the template is presented as an overlay on the display and that do not change. Alternately, dynamic templates may allow fitting to a displayed image of a user's face, either manually by the user or automatically through image analysis of the displayed face image. Perspective angles and/or preference factors may be determined, at least in part, through the fitting of a dynamic template to features of the face of a user, as is to be appreciated.

Interactive displays may also be used in identification of preferred perspective angles. In some such embodiments, a face image is generated from a face model and presented to the user. The user may actively rotate the image to a preferred orientation. This may be accomplished through user interface (UI) control features present on the same display that shows the face image, such as further shown in the embodiment of FIG. 2, which includes sliders to adjust pan angle 209, tilt angle 211, and rotation angle 213. Preferred perspective angles may then be determined from the identified, preferred orientation of the face in view of any preference factors that are also present. A face model for such an embodiment may be generated using known techniques. Alternatively, the face image presented to the user can be a real-time view of the user's face captured live through the local camera of the system. The user can then make adjustments using the UI control features and the perspective angle of the user's face image present on the display will be adjusted in real-time. Once the perspective angle of the user's face is such that the user appears to be looking at the camera, a prompt can be provided to the user indicating an optimal or otherwise acceptable perspective angle has been achieved. In still other such embodiments, the user can manually select the final perspective angle to be used when imaging the user's face, by selecting a "Store Settings" UI button that could be presented on the display next to the UI control features.

FIG. 3 illustrates another embodiment of a type of template that may be used to capture images at particular perspective angles and/or to capture images at various perspective angles that may be useful to synthesizing one or more virtual images of a user. A display 301 of the smart phone 300 in FIG. 3 includes a template 303 that shows one or more facial features 305 that may be used to indicate alignment of a user's face at a particular angle and/or to provide a warning or indicator when a user's face is out of position for image capture. The smartphone of FIG. 3 includes a single camera 307, unlike the embodiment of FIG. 2, such that capturing images from different perspective angles includes capturing images at different times. Additionally or alternately, indicators 309 that inform a user how to move the smartphone relative to their head or that act as warnings when a user's head is out of position may help a user position the camera appropriately to a capture images at particular perspective angles. Indicators may include visual cues, such as arrows presented on the display of a smartphone, according to some embodiments. Audible cues may also be used to help a user position the camera to capture an image at a particular angle.

Preferred perspective angles may be determined for preference factors through presentation of face images at different perspective angles. According to one embodiment, a virtual image is synthesized for presentation to a user at one or more different preferred perspective angles. A user may identify preferred images among those that are shown and from which preferred perspective angles may be determined and/or refined. According to one embodiment, a user selects a single face image and each of the pan angle, tilt angle and rotation angle of the selected image is used to define or refine a preferred perspective image. According to other embodiments, a user may select one or more images that are each associated with a particular type of perspective angle (i.e., a pan angle, a tilt angle, or a rotation angle). According to yet other embodiments, an interactive view of a user's face may be presented that the user can manipulate to a preferred orientation. The selected image(s) may then be used to define or refine a preferred perspective angle or range of angles for the corresponding perspective angle type in view of any preference factors that are also displayed (or absent) in the images presented to the user.

Face images may be presented at different times and/or to different users to identify preferred perspective angles for various preference factors, according to some embodiments. By way of example, a user may be presented with a first pair or set of images that have one or more different perspective angles and one or more different preference factors. The selection by the user among the presented images may be used to determine perspective angle preferences among those presented in the first pair or set of face images. A second pair or set of images that display a face with at least one varying perspective angle or preference factor may then be presented to the user for selection. The user selection from the second pair or set of face images may be used to further refine knowledge of a preferred perspective angle. Additional pairs or sets of face images may continue to be shown to the user, further refining knowledge of the preferred perspective angles of the user and/or for the user in view of the different preference factors.

Interactive displays may also be used in identification of preferred perspective angles. In some of such embodiments, a face image is generated from a face model and presented to the user having a preferred orientation for any identified preference factors. The user may actively rotate the image to refine or adjust the orientation to a personally preferred orientation. This may be accomplished through UI control features present on the same display that shows the face image, such as shown in the embodiment of FIG. 2 which includes sliders to adjust pan angle 209, tilt angle 211, and rotation angle 213. As previously explained, preferred perspective angles may then be determined from the identified, preferred orientation of the face in view of any preference factors that are also present. Alternatively, the face image presented to the user can be a real-time view of the user's face captured live through the local camera of the system. As previously explained with reference to FIG. 2, the user can make adjustments using the UI control features and the perspective angle of the user's face image will be adjusted in real-time. The previously discussion with respect to such embodiments is equally applicable here.

Face images that are presented to a user for viewing, refining, and/or determining preferred perspective angles, may be images of the user or of others. According to some embodiments, face images are presented as a generic face having a face type similar to that of the user. Alternately, some embodiments may identify publicly known and/or famous individuals to present to a user for determining preferred perspective angles. Publicly known individuals that have similar face types as a user may be identified for presentation or a user may simply select a publicly known figure of their choice, according to some embodiments.

System Architecture

Figure 4:
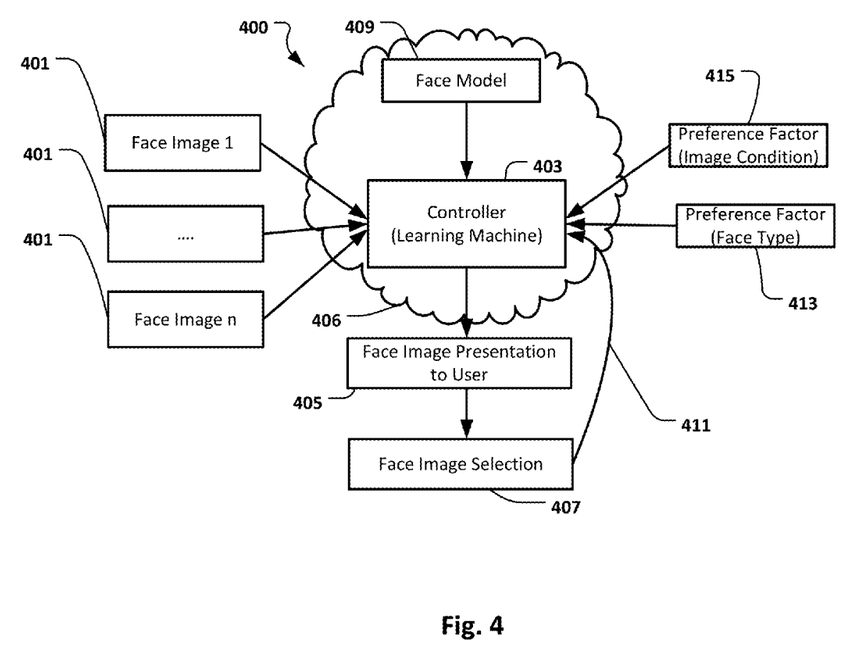
FIG. 4 shows architecture of a system for producing face images having preferred perspective angles, according to one embodiment of the present disclosure.

FIG. 4 shows architecture 400 of a system for producing face images having preferred perspective angles, according to one embodiment. The system includes one or more cameras that capture face images as input 401. The face images may be presented to a controller 403 that handles face image processing and presentation 405 for face image selection 407 by a user to identify or adjust preferred perspective angle(s), as described herein. Alternately, the captured images may be applied to a face model 409 that is provided to the controller 403 such that one or more new views having different perspective angles may be synthesized and subsequently presented to a user. Preferred perspective angles that have been identified through face image selection may be provided as feedback 411 to the controller 403 that may act as a learning machine to stores and/or updates information relating to preference angles that have been identified, including any associated preference factors such as face type 413 and image conditions 415. The learning machine may propose perspective angles for a particular user based on prior identifications and/or any recorded user preferences.

Various portions of the system shown in FIG. 4 may be implemented in server-client computer architecture that distributes activities across multiple clients from a common server. According to one example, the system is implemented in so-called cloud based software as a service platform 403. In such an embodiment, users may access and update information that resides in the cloud 403 through mobile electronic devices, such as smartphones, tablets, and other network connected computing devices. System architecture of this nature enables information regarding preferred perspective angles and preference factors across wide groups of users, which may lend to improved information regarding preferred or optimal perspective angles for different preference factors. Thus, the service platform 403 could also include cloud server or other remote computing system programmed or otherwise configured to store the preference data and to run the preference learning, angle selection or identification, and view synthesis processes as provided herein (such as the methodology of FIG. 5). As will be appreciated, running these processes on a cloud-based service platform means that the local computing device will not have to consume power or processor bandwidth to carry out the methodology.

Methodology

Figure 5:
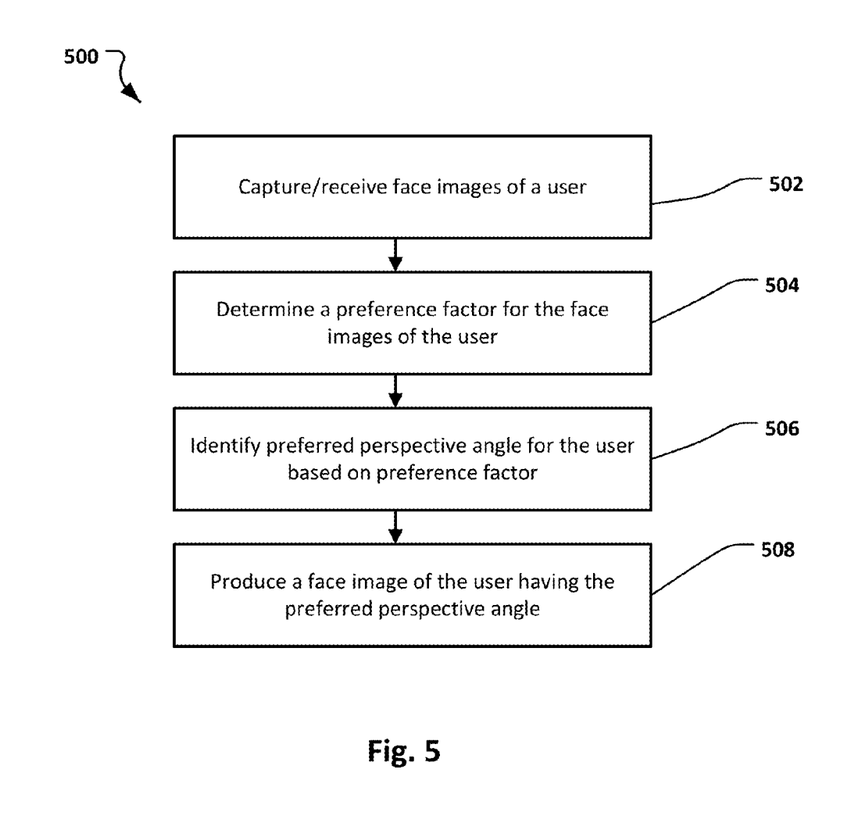
FIG. 5 depicts acts of a method of identifying preferred perspective angles and producing a face image having the preferred perspective angles, according to one embodiment of the present disclosure.

FIG. 5 illustrates a methodology 500 configured in accordance with an embodiment of the present disclosure. The method may be implemented, for example, by an apparatus that includes at least one processor and at least one non-transitory computer-readable storage medium having encoded thereon executable instructions that, when executed by the at least one processor, cause the at least one processor to carry out the method 500. The method may include an act of capturing or otherwise receiving face images of a user 502. One or more preference factors may then be automatically determined for the face images of the user 504. Subsequently, a preferred perspective angle may then be identified for the user, based on the preference factor 506. The preferred perspective angle may be based on factors such as the extent to which the user appears to be looking at the camera at that particular perspective angle and any other personal preferences provided by the user (e.g., for instance, the user may prefer a perspective angle that favors his/her right or left side) or may be provided by the learning machine of the apparatus. In any such cases, the preferred perspective angle can be stored or otherwise made accessible to the user's imaging device, whether by storage local to the device or remote from the device(s) in a network-based storage. Additionally, a face image may be produced of the user having the preferred perspective angles 508. The previously stored preferred perspective angle can be accessed as needed to provide such face images, such as during subsequent selfie and video chat sessions.

Example System

Figure 6:
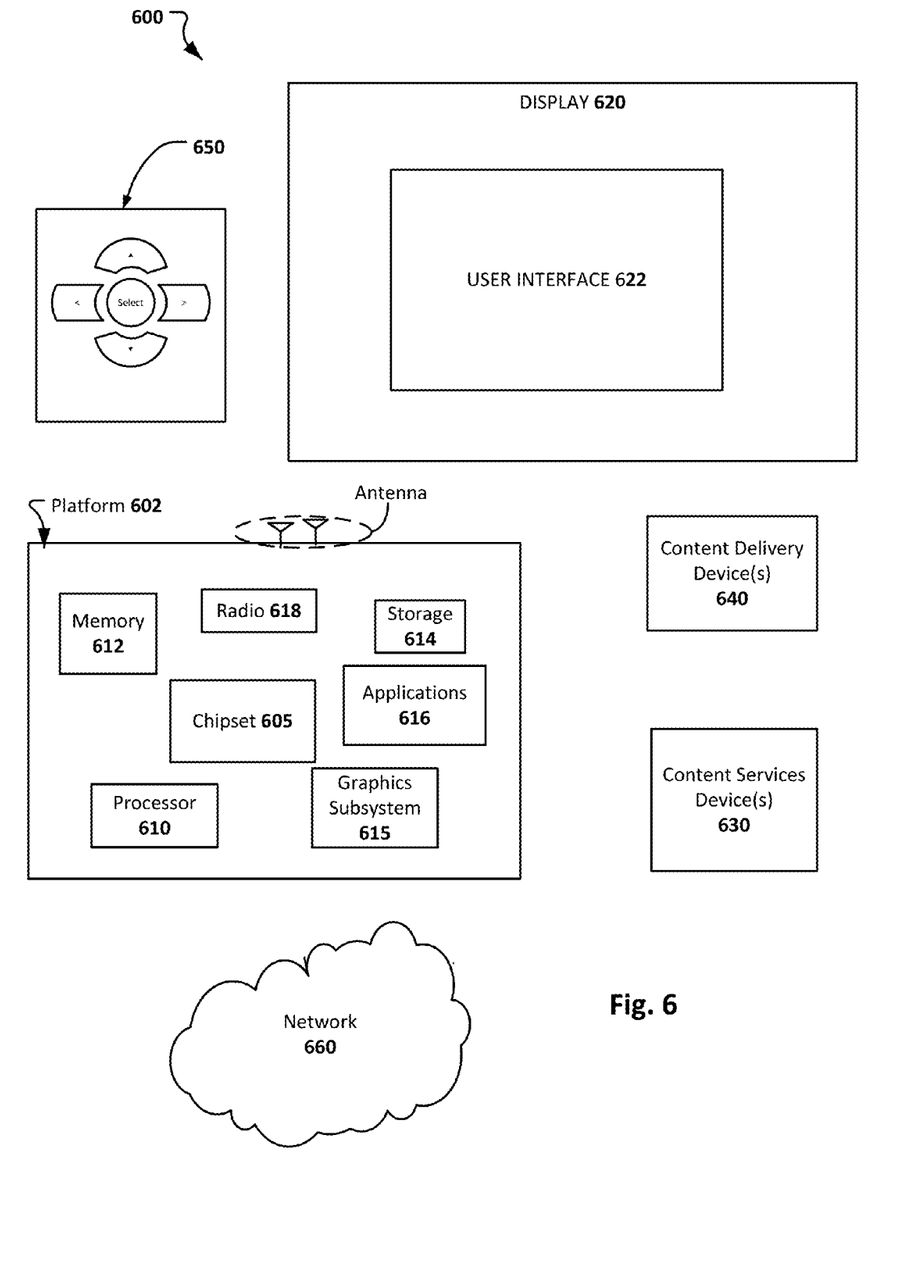
FIG. 6 shows a media system configured in accordance with an embodiment of the present disclosure.

FIG. 6 illustrates a system 600 configured in accordance with an embodiment of the present disclosure. In some embodiments, system 600 may be a system for showing still or moving images although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact with, for example, platform 602 and/or display 620, so as to supplement navigational gesturing by the user. Each of these example components is described in more detail below.

In some embodiments, platform 602 may comprise any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 610 may comprise dual-core processor(s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 614 may comprise technology to increase the storage performance enhanced protection for valuable digital media when multiple hard drives are included, for example.

Graphics subsystem 615 may perform processing of images such as still or video for display, and in some embodiments is configured to synthesize face images, as variously described herein. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The graphics and/or video processing techniques, including the techniques for identifying and producing preferred face orientations described herein, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, content services device(s) 630 may be hosted by any national, international and/or independent service and thus accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In some embodiments, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the present disclosure. In some embodiments, platform 602 may receive control signals from navigation controller 650 having one or more navigation features. The navigation features of controller 650 may be used to interact with user interface 622, for example. In some embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 650 may be echoed on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In some embodiments, controller 650 may not be a separate component but integrated into platform 602 and/or display 620. Embodiments, however, are not limited to the elements or in the context shown or described herein, as will be appreciated.

In some embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chipset 605 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, images (e.g., selfies, etc.), video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 6.

As described above, system 600 may be embodied in varying physical styles or form factors. FIG. 7 illustrates embodiments of a small form factor device 700 in which system 600 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, mobile electronic device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device, which in one example embodiment is a touchscreen display. I/O device 706 may comprise any suitable I/O device for entering information into a mobile computing device. Examples for I/O device 706 may include an alphanumeric keyboard, a numeric keypad, a touch pad, input keys, buttons, a camera, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

FURTHER EXAMPLE EMBODIMENTS

The following examples pertain to further embodiments, from which numerous permutations and configurations will be apparent.

Example 1 is a method of producing a face image. The method includes capturing one or more face images of face A and identifying at least one preferred perspective angle for face A based on at least one preference factor for face images of face A. The method also includes producing an image of a face A having the preferred perspective angle for face A.

Example 2 includes the subject matter of example 1 and further includes determining the at least one preference factor for face images of face A.

Example 3 includes the subject matter of example 2, wherein determining the at least one preference factor includes determining a face type of face A from the one or more images of face A.

Example 4 includes the subject matter of any of examples 2-3, wherein determining the at least one preference factor includes determining image capture conditions from the one or more images of face A.

Example 5 includes the subject matter of any of examples 2-4, wherein determining the at least one preference factor includes determining a previously identified preferred perspective angle for face A.

Example 6 includes the subject matter of any of the preceding examples and further includes presenting a display having a template that indicates positioning of face A with respect to an image capture device.

Example 7 includes the subject matter of any of the preceding examples, wherein the at least one preferred perspective angle includes a reduce tilt angle to improve eye contact.

Example 8 includes the subject matter of any of the preceding examples, wherein capturing one or more face images includes capturing a plurality of face images of face A at a common time with a plurality of image capture devices oriented to capture face images having different perspective angles.

Example 9 includes the subject matter of any of examples 1-7, wherein capturing one or more face images includes capturing a plurality of face images of face A at different times with a common image capture device.

Example 10 includes the subject matter of any of the preceding examples, wherein producing the image includes producing a synthesized image.

Example 11 includes the subject matter of example 10, wherein producing the synthesized image includes creating a virtual view of the preferred perspective angle for face A.

Example 12 includes the subject matter of any of the preceding examples, wherein identifying the at least one preferred perspective angle includes identifying two or more of face pan angle, face tilt angle, and face rotation angle of face A.

Example 13 includes the subject matter of any of the preceding examples, wherein identifying the at least one preferred perspective angle includes identifying each of face pan angle, face tilt angle, and face rotation angle of face A.

Example 14 includes the subject matter of any of the preceding examples, and further includes storing the at least one preferred perspective angle and the at least one preference factor for face A in an electronic storage (e.g., one or more non-transitory computer readable mediums). In one such case, the electronic storage is a cloud-based storage medium. The cloud-based storage medium may be accessible by a communication network, such as the Internet and/or a private network.

Example 15 includes the subject matter of any of the preceding examples, wherein the at least one preference factor is determined by presenting the one or more face images of face A to a user with an interactive image of face A and receiving a selected preferred perspective angle from the user through an interactive display.

Example 16 includes the subject matter of any of the preceding examples, wherein the at least one preference factor is determined by presenting an interactive face image and receiving a selected preferred perspective angle based on adjustments to that interactive face image via a user interface control feature.

Example 17 includes the subject matter of any of the preceding examples, and further includes updating stored information on the at least one preferred perspective angle for faces having similarities to face A with feedback received from another user for preferred perspective angles based on the at least one preference factor.

Example 18 includes the subject matter of any of the preceding examples, and further includes updating stored information on the at least one preferred perspective angle for faces having similarities to face A with feedback received from a plurality of other users for preferred perspective angles based on the at least one preference factor.

Example 19 includes the subject matter of any of examples 17-18, wherein updating stored information on the at least one preferred perspective angle for faces having similarities to face A includes applying a learning algorithm to the feedback received from users.

Example 20 includes the subject matter of example 19, and further includes identifying at least one preferred perspective angle for face A based on the at least one preference factor by applying the learning algorithm to the feedback received from users.

Example 21 includes the subject matter of any of the preceding examples, and further includes capturing one or more face images of each of a plurality of additional users; identifying at least one preferred perspective angle for faces of each of the plurality of additional users based on at least one preference factor for face images of each of the plurality of additional users; and storing the at least one preferred perspective angle for faces of each of the plurality of additional users based on at least one preference factor for face images of each of the plurality of additional users. Again, the storing could be achieved, for example, using a cloud-based storage medium or server configured to store the preference data and to run the preference learning and identification processes.

Example 22 includes the subject matter of examples 21, and further includes producing a synthesized face image of each of the plurality of additional users based on the at least one preference factor for face images of each of the plurality of additional users.

Example 23 is computer program product comprising one or more non-transient computer-readable mediums having encoded thereon executable instructions that, when executed by at least one processor, cause the at least one processor to carry out a process of producing a face image. The process includes receiving one or more face images of face A and identifying at least one preferred perspective angle for face A based on at least one preference factor for face images of face A. The process also includes producing an image of a face A having the preferred perspective angle for face A.

Example 24 includes the subject matter of example 23, the process further including determining the at least one preference factor for face images of face A.

Example 25 includes the subject matter of example 24, wherein determining the at least one preference factor includes determining a face type of face A from the one or more images of face A.

Example 26 includes the subject matter of any of examples 24-25, wherein determining the at least one preference factor includes determining image capture conditions from the one or more images of face A.

Example 27 includes the subject matter of any of examples 24-26, wherein determining the at least one preference factor includes determining a previously identified preferred perspective angle for face A.

Example 28 includes the subject matter of any of examples 23-27, wherein the at least one preferred perspective angle includes a reduce tilt angle to improve eye contact.

Example 29 includes the subject matter of any of examples 23-28, wherein receiving one or more face images includes capturing a plurality of face images of face A at a common time with a plurality of image capture devices oriented to capture face images having different perspective angles.

Example 30 includes the subject matter of any of examples 23-28, wherein receiving one or more face images includes capturing a plurality of face images of face A at different times with a common image capture device.

Example 31 includes the subject matter of any of examples 23-30, wherein producing the image includes producing a synthesized image.

Example 32 includes the subject matter of example 31, wherein producing the synthesized image includes creating a virtual view of the preferred perspective angle for face A.

Example 33 includes the subject matter of any of examples 23-32, wherein identifying the at least one preferred perspective angle includes identifying two or more of face pan angle, face tilt angle, and face rotation angle of face A.

Example 34 includes the subject matter of any of examples 23-33, wherein identifying the at least one preferred perspective angle includes identifying each of face pan angle, face tilt angle, and face rotation angle of face A.

Example 35 includes the subject matter of any of examples 23-34, and further includes storing the at least one preferred perspective angle and the at least one preference factor for face A in an electronic storage (e.g., one or more non-transitory computer readable mediums).

Example 36 includes the subject matter of example 35, wherein the electronic storage is a cloud-based storage medium (e.g., accessible via the Internet and/or some other communication network).

Example 37 includes the subject matter of any of examples 23-36, wherein the at least one preference factor is determined by presenting the one or more face images of face A to a user with an interactive image of face A and receiving a selected preferred perspective angle from the user through an interactive display.

Example 38 includes the subject matter of any of examples 23-37, wherein the at least one preference factor is determined by presenting an interactive face image and receiving a selected preferred perspective angle based on adjustments to that interactive face image via a user interface control feature.

Example 39 includes the subject matter of any of examples 23-38, and further includes updating stored information on the at least one preferred perspective angle for faces having similarities to face A with feedback received from another user for preferred perspective angles based on the at least one preference factor.

Example 40 includes the subject matter of any of examples 23-52, further includes updating stored information on the at least one preferred perspective angle for faces having similarities to face A with feedback received from a plurality of other users for preferred perspective angles based on the at least one preference factor.

Example 41 includes the subject matter of example 39 or 40, wherein updating stored information on the at least one preferred perspective angle for faces having similarities to face A includes applying a learning algorithm to the feedback received from users.

Example 42 includes the subject matter of example 41, and further includes identifying at least one preferred perspective angle for face A based on the at least one preference by applying the learning algorithm to the feedback received from users.

Example 43 includes the subject matter of any of examples 23-42, and further includes capturing one or more face images of each of a plurality of additional users; identifying at least one preferred perspective angle for faces of each of the plurality of additional users based on at least one preference factor for face images of each of the plurality of additional users; and storing the at least one preferred perspective angle for faces of each of the plurality of additional users based on at least one preference factor for face images of each of the plurality of additional users.

Example 44 includes the subject matter of example 43, and further includes producing a synthesized face image of each of the plurality of additional users based on the at least one preference factor for face images of each of the plurality of additional users.

Example 45 includes is a system, device, or apparatus comprising one or more processors and one or more electronic storage mediums or memories encoding instructions that when executed by the one or more processors cause a process to be carried out, such as the processes variously defined in any of examples 1-44. In some cases, the process includes: receive one or more face images of face A; identify at least one preferred perspective angle for face A based on at least one preference factor for face images of face A; and produce an image of a face A having the preferred perspective angle for face A. The process may further include determine the at least one preference factor for face images of face A, by at least one of: determine a face type of face A from the one or more images of face A; determine image capture conditions from the one or more images of face A; and determine a previously identified preferred perspective angle for face A. In some cases, the at least one preferred perspective angle includes a reduce tilt angle to improve eye contact. In some cases, a plurality of face images are received, and the process further includes: cause capture of the plurality of face images of face A at a common time with a plurality of image capture devices oriented to capture face images having different perspective angles. In some cases, the image is produced by producing a synthesized image, and producing the synthesized image includes creating a virtual view of the preferred perspective angle for face A. In some cases, the at least one preference factor is determined by presenting an interactive face image and receiving a selected preferred perspective angle based on adjustments to that interactive face image via a user interface control feature. In some cases, the process further includes: store the at least one preferred perspective angle and the at least one preference factor for face in a cloud-based storage medium; and update stored information on the at least one preferred perspective angle for faces having similarities to face A with feedback received from one or more other users for preferred perspective angles based on the at least one preference factor. In some such cases, the stored information is updated by applying a learning algorithm to the feedback, and the process further includes: identify at least one preferred perspective angle for face A based on the at least one preference by applying the learning algorithm to the feedback. In some cases, the process includes: capture one or more face images of each of a plurality of additional users; identify at least one preferred perspective angle for faces of each of the plurality of additional users based on at least one preference factor for face images of each of the plurality of additional users; store the at least one preferred perspective angle for faces of each of the plurality of additional users based on at least one preference factor for face images of each of the plurality of additional users; and produce a synthesized face image of each of the plurality of additional users based on the at least one preference factor for face images of each of the plurality of additional users.

Example 46 is a mobile computing device, system, or apparatus that includes the subject matter of example 45. The mobile computing device, system, or apparatus may be, for example, a smartphone, tablet computer, or laptop computer. Other mobile computing platforms will be apparent in light of this disclosure.

Example 47 includes the subject matter of example 45 or 46 and further includes one or more image capture devices.

Example 48 includes the subject matter of any of examples 45-47 and further includes a display. The display can be used to display, for example, the image of face A having the preferred perspective angle for face A. The display may be an integrated display such as the example case of a tablet or smartphone having a touch screen display or a laptop having a lid-based LED display, or an external display that is communicatively coupled to a computing system (via a cable or wireless communication link) such as a desktop or workstation computer system.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A computer program product comprising one or more non-transitory computer-readable mediums having encoded thereon executable instructions that, when executed by at least one processor, cause the at least one processor to carry out a process of producing a face image, the process comprising:

receiving one or more face images of face A;

identifying at least one preferred perspective angle for face A based on at least one preference factor for face images of face A by applying a learning algorithm to feedback received from at least one user for preferred perspective angles;

updating stored information on at least one preferred perspective angle for faces having similarities to face A with feedback received from at least one other user for preferred perspective angles based on the at least one preference factor by applying the learning algorithm to the feedback received from the at least one other user; and producing a synthesized image of a face A having the at least one preferred perspective angle for face A.

2. The computer program product of claim 1, the process further comprising:

determining the at least one preference factor for face images of face A.

3. The computer program product of claim 2, wherein determining the at least one preference factor includes at least one of: determining a face type of face A from the one or more images of face A; determining image capture conditions from the one or more images of face A; and determining a previously identified preferred perspective angle for face A.

4. The computer program product of claim 1, wherein the at least one preferred perspective angle includes a reduce tilt angle to improve eye contact.

5. The computer program product of claim 1, wherein receiving one or more face images includes one of:

capturing a plurality of face images of face A at a common time with a plurality of image capture devices oriented to capture face images having different perspective angles; and capturing a plurality of face images of face A at different times with a common image capture device.

6. The computer program product of any of claim 1, wherein producing the synthesized image includes creating a virtual view of the at least one preferred perspective angle for face A.

7. The computer program product of claim 1, the process further comprising:

storing the at least one preferred perspective angle and the at least one preference factor for face in a cloud-based storage medium.

8. The computer program product of claim 1, wherein the at least one preference factor is determined by presenting an interactive face image and receiving a selected preferred perspective angle based on adjustments to the interactive face image via a user interface control feature.

9. The computer program product of claim 1, the process further comprising:

capturing one or more face images of each of a plurality of additional users;

identifying at least one preferred perspective angle for faces of each of the plurality of additional users based on at least one preference factor for face images of each of the plurality of additional users;

storing the at least one preferred perspective angle for faces of each of the plurality of additional users based on at least one preference factor for face images of each of the plurality of additional users; and producing a synthesized face image of each of the plurality of additional users based on the at least one preference factor for face images of each of the plurality of additional users.

10. A mobile computing device comprising the computer program product of claim 1 and an image capture device.

11. A system, comprising:

one or more processors; and a memory having encoded thereon executable instructions that, when executed by the one or more processors, cause the one or more processors to carry out a process of producing a face image, the process including:

receive one or more face images of face A;

identify at least one preferred perspective angle for face A based on at least one preference factor for face images of face A by applying a learning algorithm to feedback received from at least one user for preferred perspective angles;

store the at least one preferred perspective angle and the at least one preference factor for face A in a cloud-based storage medium;

update stored information on at least one preferred perspective angle for faces having similarities to face A with feedback received from at least one other user for preferred perspective angles based on the at least one preference factor by applying the learning algorithm to the feedback received from the at least one other user; and produce a synthesized image of a face A having the at least one preferred perspective angle for face A.

12. The system of claim 11, the process further comprising:

determine the at least one preference factor for face images of face A, by at least one of: determine a face type of face A from the one or more images of face A; determine image capture conditions from the one or more images of face A; and determine a previously identified preferred perspective angle for face A.

13. The system of claim 11, wherein the at least one preferred perspective angle includes a reduce tilt angle to improve eye contact.

14. The system of claim 11, wherein a plurality of face images are received, the process further comprising one of:

cause capture of the plurality of face images of face A at a common time with a plurality of image capture devices oriented to capture face images having different perspective angles; and cause capture a plurality of face images of face A at different times with a common image capture device.

15. The system of claim 11, wherein producing the synthesized image includes creating a virtual view of the at least one preferred perspective angle for face A.

16. The system of claim 11, wherein the at least one preference factor is determined by presenting an interactive face image and receiving a selected preferred perspective angle based on adjustments to the interactive face image via a user interface control feature.

17. The system of claim 11, the process further comprising:

capture one or more face images of each of a plurality of additional users;

identify at least one preferred perspective angle for faces of each of the plurality of additional users based on at least one preference factor for face images of each of the plurality of additional users;

store the at least one preferred perspective angle for faces of each of the plurality of additional users based on at least one preference factor for face images of each of the plurality of additional users; and produce a synthesized face image of each of the plurality of additional users based on the at least one preference factor for face images of each of the plurality of additional users.

18. A method of producing a face image, the method comprising:
    capturing one or more face images of face A;
    identifying at least one preferred perspective angle for face A based on at least one preference factor for face images of face A by applying a learning algorithm to feedback received from at least one user for preferred perspective angles;
    updating stored information on at least one preferred perspective angle for faces having similarities to face A with feedback received from at least one other user for preferred perspective angles based on the at least one preference factor by applying the learning algorithm to the feedback received from the at least one other user; and
    producing a synthesized image of a face A having the at least one preferred perspective angle for face A.

19. The method of claim 18, further comprising:
    determining the at least one preference factor for face images of face A, wherein the determining includes at least one of: determining a face type of face A from the one or more images of face A; determining image capture conditions from the one or more images of face A; and determining a previously identified preferred perspective angle for face A.

20. The method of claim 18, wherein capturing one or more face images includes one of:
    capturing a plurality of face images of face A at a common time with a plurality of image capture devices oriented to capture face images having different perspective angles; and
    capturing a plurality of face images of face A at different times with a common image capture device.

21. The method of claim 18, wherein producing the synthesized image includes creating a virtual view of the at least one preferred perspective angle for face A.

* * * * *